United States Patent
Bernard et al.

(10) Patent No.: US 8,710,364 B2
(45) Date of Patent: Apr. 29, 2014

(54) MULTIPLE ANGLE BEND FOR HIGH-VOLTAGE LINES

(71) Applicant: Alstom Technology Ltd., Baden (CH)

(72) Inventors: Mathieu Bernard, Aix les Bains (FR); Frederic Roussel, Conjux (FR)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/713,510

(22) Filed: Dec. 13, 2012

(65) Prior Publication Data
US 2013/0153258 A1   Jun. 20, 2013

(30) Foreign Application Priority Data
Dec. 14, 2011   (FR) ...................... 11-61605

(51) Int. Cl.
*H01B 7/00*   (2006.01)
(52) U.S. Cl.
USPC ............................................. 174/28
(58) Field of Classification Search
USPC ............... 174/28, 96, 98, 102, 111, 99, 100, 174/137 R, 5 R, 5 SB, 5 SG, 17 R, 371, 32, 174/41–44, 45 R, 45 TD, 84 R, 86, 87, 24, 174/40 R
See application file for complete search history.

(56) References Cited

U.S. PATENT DOCUMENTS

| | | | |
|---|---|---|---|
| 1,777,072 A * | 9/1930 | Burnham | 218/91 |
| 1,906,421 A * | 5/1933 | Rossman | 361/603 |
| 2,057,273 A * | 10/1936 | Little | 174/129 B |
| 2,153,527 A * | 4/1939 | Battermann | 174/88 C |
| 2,165,961 A * | 7/1939 | Cork et al. | 343/832 |
| 2,223,300 A * | 11/1940 | De Bellis | 174/99 B |
| 2,275,203 A * | 3/1942 | Rudd | 174/43 |
| 2,588,436 A * | 3/1952 | Violette | 333/261 |
| 2,658,939 A * | 11/1953 | Greenfield et al. | 174/24 |
| 3,324,272 A * | 6/1967 | Shankle et al. | 200/305 |
| 3,448,202 A * | 6/1969 | Whitehead | 174/28 |
| 3,546,356 A * | 12/1970 | Graybill et al. | 174/21 C |
| 3,551,587 A * | 12/1970 | Propst | 174/152 R |
| 3,573,341 A * | 4/1971 | Graybill et al. | 174/22 C |
| 3,585,271 A * | 6/1971 | Reynolds et al. | 174/16.2 |
| 3,609,209 A * | 9/1971 | Houston et al. | 174/42 |
| 3,629,531 A * | 12/1971 | Trolin | 200/48 R |
| 3,647,933 A * | 3/1972 | Okada et al. | 174/43 |

(Continued)

FOREIGN PATENT DOCUMENTS

| | | |
|---|---|---|
| DE | 19803977 | 11/1999 |
| FR | 2738946 | 3/1997 |

*Primary Examiner* — Jenny L Wagner
*Assistant Examiner* — Michael E Moats, Jr.
(74) *Attorney, Agent, or Firm* — Pearne & Gordon LLP

(57) ABSTRACT

The bend of the invention makes it possible to provide a great number of different direction changes in the configuration of gas-insulated high-voltage lines.
The bend mainly uses an angled ferrule (11). associated with two angular rings (12), placed between the angled ferrule (11) and a straight section (13) of the line, each angular ring (12) forming a change of direction defined by a determined angular offset angle (α) between said two joining surfaces. Thus, the use of an angled ferrule (11), in combination with one or two angular rings (12) makes it possible to obtain the four angular offsets of 70°, 80°, 100°, 110°. These same angular rings (12), used with an angled ferrule having an angle of 140° makes it possible to obtain the angles of 120°, 130°, 150°, and 160°.
Use for constructing gas-insulated high-voltage lines.

6 Claims, 5 Drawing Sheets

(56) References Cited

U.S. PATENT DOCUMENTS

| | | | |
|---|---|---|---|
| 3,740,925 A * | 6/1973 | Gothard | 95/74 |
| 3,767,837 A * | 10/1973 | Graybill | 174/27 |
| 3,794,849 A * | 2/1974 | Perry et al. | 307/147 |
| 3,814,879 A * | 6/1974 | Cookson et al. | 218/1 |
| 3,856,978 A * | 12/1974 | Sletten et al. | 174/14 R |
| 3,889,788 A * | 6/1975 | Littler et al. | 191/40 |
| 3,925,595 A * | 12/1975 | Hawkins | 174/42 |
| 3,944,716 A * | 3/1976 | Katzbeck et al. | 174/21 R |
| 4,017,675 A * | 4/1977 | Hopkins et al. | 174/21 C |
| 4,029,890 A * | 6/1977 | Nakata | 174/14 R |
| 4,029,892 A * | 6/1977 | Nakata | 174/14 R |
| 4,104,481 A * | 8/1978 | Wilkenloh et al. | 174/28 |
| 4,366,339 A * | 12/1982 | Cookson et al. | 174/21 JS |
| 4,366,340 A * | 12/1982 | Trinh | 174/28 |
| 4,370,511 A * | 1/1983 | Cookson et al. | 174/14 R |
| 4,379,957 A * | 4/1983 | Calvino | 218/2 |
| 4,554,399 A * | 11/1985 | Cookson | 174/14 R |
| 4,956,525 A * | 9/1990 | Wilk | 174/152 R |
| 4,963,819 A * | 10/1990 | Clarke et al. | 324/126 |
| 5,128,824 A * | 7/1992 | Yaworski et al. | 361/127 |
| 5,142,440 A * | 8/1992 | Lorenz et al. | 361/618 |
| 5,185,497 A * | 2/1993 | Poth | 174/21 C |
| 5,416,266 A * | 5/1995 | Muller | 174/21 C |
| 5,558,524 A * | 9/1996 | Classon et al. | 439/92 |
| 5,565,652 A * | 10/1996 | Frye | 174/24 |
| 5,589,674 A * | 12/1996 | Berger et al. | 218/71 |
| 5,721,412 A * | 2/1998 | Schifko et al. | 218/43 |
| 5,764,472 A * | 6/1998 | Schuld | 361/602 |
| 5,991,148 A * | 11/1999 | Heil et al. | 361/605 |
| 6,166,323 A * | 12/2000 | Kelch et al. | 174/21 R |
| 6,332,785 B1 * | 12/2001 | Muench et al. | 439/88 |
| 6,400,558 B1 * | 6/2002 | Chaply et al. | 361/600 |
| 6,729,587 B1 * | 5/2004 | White | 248/72 |
| 6,743,999 B2 * | 6/2004 | Muraki et al. | 218/2 |
| 7,053,326 B2 * | 5/2006 | Muraki et al. | 218/2 |
| 7,600,901 B2 * | 10/2009 | Gordin et al. | 362/431 |
| 7,732,708 B1 * | 6/2010 | Peabody | 174/40 R |
| 7,838,766 B2 * | 11/2010 | Dau | 174/40 R |
| 2001/0040146 A1 * | 11/2001 | Miyo et al. | 218/118 |
| 2002/0053553 A1 * | 5/2002 | Muraki et al. | 218/7 |
| 2002/0134757 A1 * | 9/2002 | Nishizumi et al. | 218/118 |
| 2004/0013466 A1 * | 1/2004 | Sondrup | 404/26 |
| 2004/0169015 A1 * | 9/2004 | Muraki et al. | 218/2 |
| 2004/0262022 A1 * | 12/2004 | Shirmohamadi | 174/40 R |
| 2005/0067175 A1 * | 3/2005 | Pitschi | 174/28 |
| 2006/0110983 A1 * | 5/2006 | Muench et al. | 439/660 |
| 2008/0017397 A1 * | 1/2008 | Komiya et al. | 174/24 |
| 2011/0000697 A1 * | 1/2011 | Tsurimoto et al. | 174/24 |
| 2011/0114351 A1 * | 5/2011 | Koch | 174/24 |
| 2013/0192864 A1 * | 8/2013 | Fujita | 174/24 |

* cited by examiner

MULTIPLE ANGLE BEND FOR HIGH-VOLTAGE LINES

FIELD OF THE INVENTION

The invention relates to the field of high-voltage lines using gas-insulated technology and, in particular, it relates to angled portions designed to obtain a change of direction in the high-voltage line.

PRIOR ART AND PROBLEM POSED

High-voltage lines of the gas-insulated type make it possible to transport large quantities of electrical power over long distances. The power involved may be of the order of several million volt-amps (VA). The transmission losses are very low relative to the power transported. Finally, the lengths may be of several hundreds of kilometers. Thus, high security and reliability are obtained. Said lines present the advantage of electrical behavior that is similar to that of high-voltage overhead lines. More, the gases do not present any ageing phenomena. As a result, there is practically no limitation on their lifetime. This is essential, given the high investment costs associated with an underground system for transporting electrical power.

With reference to FIG. 1, a currently-used bend for a high-voltage line of the gas-insulated type, is shown in section. That bend mainly comprises an angled ferrule 1 having respective straight elements 6 fastened to both of its ends. Each of the straight elements is connected to a respective straight pipe (not shown) of a tubing system of the gas-insulated type. Their respective conductors are connected to the conductive element 2 of the angled ferrule 1 by means of an anti-corona cap 5 and of a conical insulator 4. The changes in direction that are obtained by angled ferrules may cover the angles in the range 4° to 90°.

However, each change of direction requires, an angled ferrule at an angle that corresponds to said change of direction. In addition, it is even common practice to use only simple bends having direction-changing angles equal to 30°, 40°, and 60°. There is therefore a need for angled ferrules of the "made-to-measure" type, that can be set to the desired angle. However, this is difficult to make compatible with the standardization of presently-used elements. The limited number of angles limits angular possibilities when using standardized bends each having a fixed change-of-direction angle.

More, industrially, it would be very costly to produce bends with angles that differ from standard angles, since that would require variant angled ferrules to be created. Finally, it is necessary to use numerous standard elements in order to make all of the necessary changes in direction.

The object of the present invention is to overcome those drawbacks, by proposing a direction-changing system for lines of the gas-insulated type, which system is suitable for ensuring the greatest number of different direction-changing angles between two straight elements of a gas-insulated high-voltage line.

SUMMARY OF THE INVENTION

To this end, the invention mainly provides a direction-changing bend for a high-voltage line of the gas-insulated type, the line comprising:
two straight sections each composed of:
  a tubular conductive bar; and
  a confinement ferrule surrounding the conductive bar; and
a bend further comprising an angled ferrule.

According to the invention, the direction-changing bend is associated with two angular rings, each designed to be interposed between the angled ferrule and one of the two conductive bars with its respective confinement ferrule via two connection surfaces, which surfaces are a first connection surface fastened on the angled ferrule and a second connection surface fastened on the corresponding conductive bar, each of the first and second connection surfaces being in a respective plane that is angularly offset from the other plane by a determined angle.

In the particular example in which the angled ferrule preferably has a bend angle of 90° or of 140°, the determined angular offset angle between said two planes of the angular rings is 10°.

In a main embodiment of the invention, the bend includes a stationary electrode designed to be connected to a first one of the two conductive bars, and a movable electrode designed to be connected to the second one of the two conductive bars and to be mounted on the stationary electrode, in such a manner as to be capable of pivoting relative thereto, in particular during mounting.

In this event, it is advantageous for the movable electrode to have a joining cavity that is inclined by the same determined angular offset angle at its end in contact with the corresponding conductive bar.

It is advantageous to use anti-corona caps between each conductive bar and one of the two electrodes.

LIST OF FIGURES

The invention and its various technical characteristics can be better understood on reading the following description, which is accompanied by several figures, in which, respectively:

FIG. 1, described above, is a section view of a prior art bend for a high-voltage line of the gas-insulated type;

FIGS. 4A, 4B, 4C, 4D, 4E, 4F, 4G, and 4H show eight mounting possibilities obtained with two different bends of the invention.

DETAILED DESCRIPTION OF TWO EMBODIMENTS OF THE INVENTION

Figure 1:
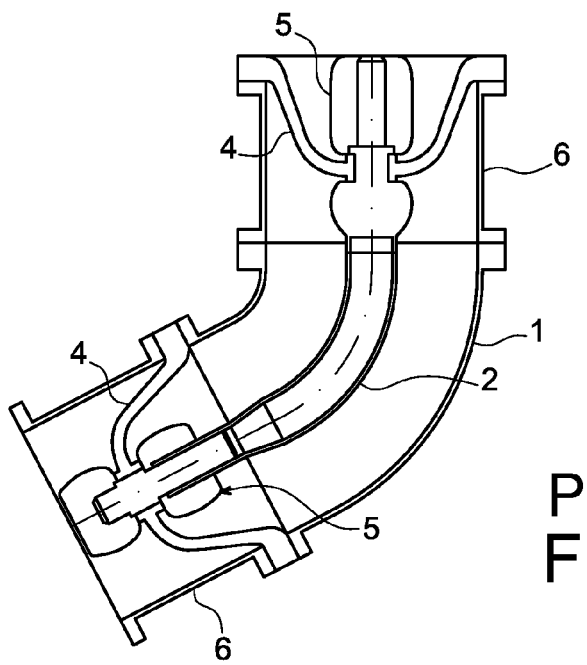
Figure 2:
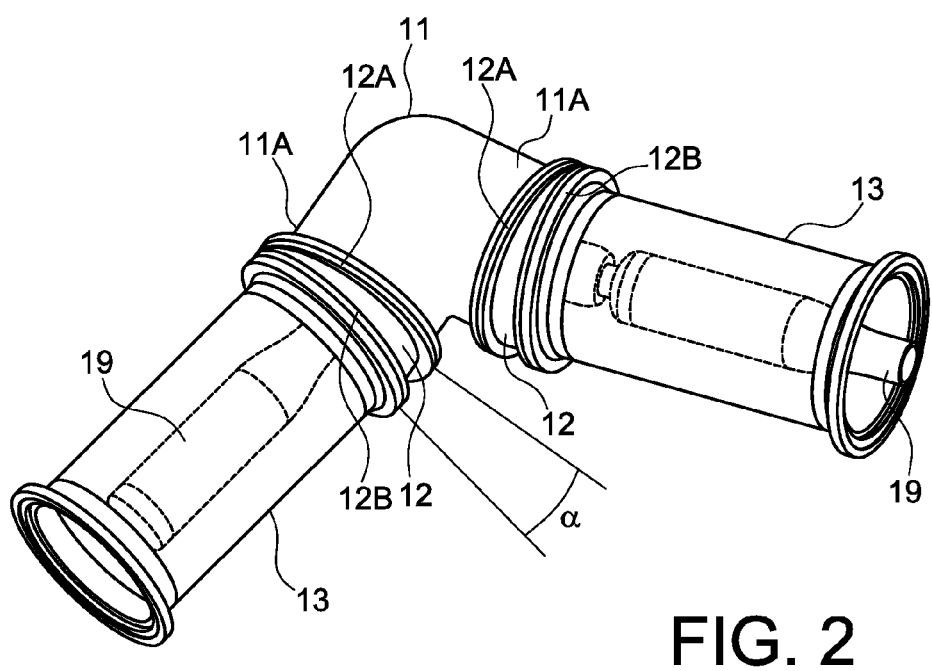
FIG. 2 is an isometric view of a bend of the invention for a high-voltage line of the gas-insulated type.

With reference to FIG. 2, the general principle governing the concept of the present invention is to permit to combine an angled ferrule 11 with one or two angular rings 12, each ring presenting a characteristic of changing direction by a determined angle.

Each of these angular rings 12 has two connection surfaces formed by two connection rings 12A and 12B. For each angular ring 12, the connection surfaces formed by the connection rings 12A and 12B are in respective planes that are angularly offset relative to each other by a determined angle α. However, in said FIG. 2, each of these angular rings 12 is fastened on the angled ferrule 11 by a first connection surface, formed by a first connection ring 12, in such a manner that the angular offset is placed in the plane defined by the bend of the angled ferrule 11. Thus, the direction defined by each outlet 11A of the angled ferrule 11 is angularly offset by the determined angle α, which angle is defined by the angle of each angular ring 12 in the plane defined by the bend of the angled casing 11.

In more concrete terms, if, as shown in said FIG. 2, the angle of the angled ferrule 11 is of 90° and the angular offset angle α of each angular ring is 10°, it is possible, by using two of said angular rings 12, to obtain a bend assembly at an angle of 110°.

Said FIG. 2 also shows the two confinement ferrules 13 and their respective conductive bars 19.

Figure 3:
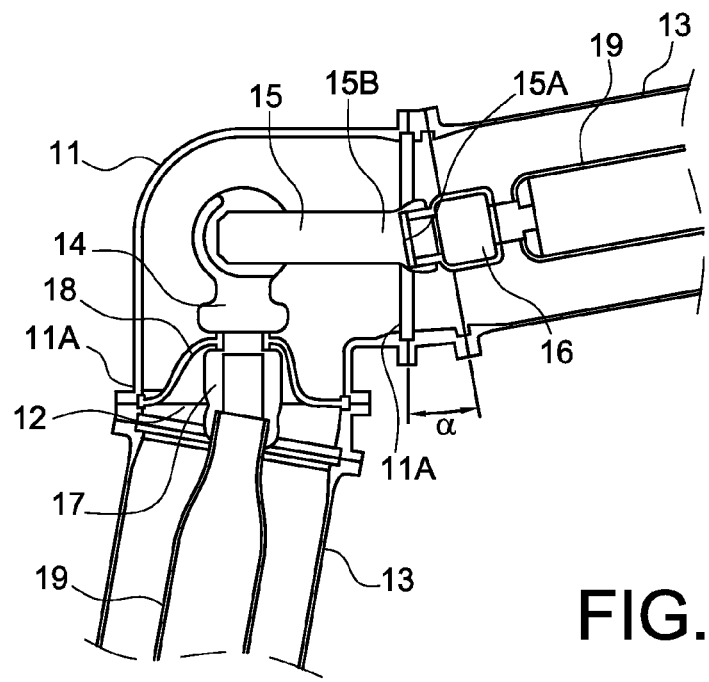
FIG. 3 is a section view of the FIG. 2 bend of the invention.

With reference to FIG. 3, the same bend is shown in section. FIG. 3 shows the two confinement ferrules 13 with their respective conductive bars 19, and the two angular rings 12, each fastened to an outlet 11A of the angled ferrule 11. In addition to supplying the two angular rings 12 at least two connection bars 15 are also provided, one bar being used per bend. The second connection bar (not shown) is used for a mounting without an angular ring 12, and it is therefore symmetrical. This connection bar 15 is electrically connected to a stationary electrode 14, which is itself connected to the conductive bar 19 that corresponds thereto. To do this, an anti-corona cap 17, associated with an insulating support 18 is used. Said support connects the end of the anti-corona cap 17 with the junction between the outlet 11A of the angled ferrule 11 and the connection surface of the corresponding angular ring 12. Said anti-corona cap is directly connected to the stationary electrode 14. The connection bar 15 is mounted in such a manner as to be suitable for being hinged at a pivot point defined by the shape of the electrode 14. Thus, during mounting, the connection bar 15 is fastened to said pivot point and directed so as to obtain the corresponding angle defined by the bend of the angled ferrule 11, namely 90° in this example. It should be noted that the other end of the connection bar 15 has a cavity 15A that is angularly offset by the determined angle α of the angular ring 12. Thus, another anti-corona cap 16 may be placed in said cavity 15A, while remaining in line with the corresponding conductive bar 19, to which it is electrically connected. Similarly, the other anti-corona cap 17, mechanically connected to the stationary electrode 14 presents an angular offset of the same determined angle α in order to obtain mechanical and electrical connection in the extension of the corresponding conductive bar 19.

It is found that, with the example of mounting shown in said FIG. 2, the change of direction obtained with such a bend is 110°. This embodiment is shown again in FIG. 4C, which is presented in combination with seven other figures: FIGS. 4A, 4B, 4D, 4E, 4F, 4G, and 4H. Each of the five first embodiments uses an angled ferrule 11 having an angle of 90°. The first of these embodiments, shown in FIG. 4A, uses two angular rings 12 mounted the opposite way round relative to FIG. 4C, i.e. the offset angle α is open towards the outside of the bend, for both angular rings 12. As a result, with the offset angle α being equal in this example to 10°, the resulting bend assembly presents an overall angle of 70°.

Figure 4A:
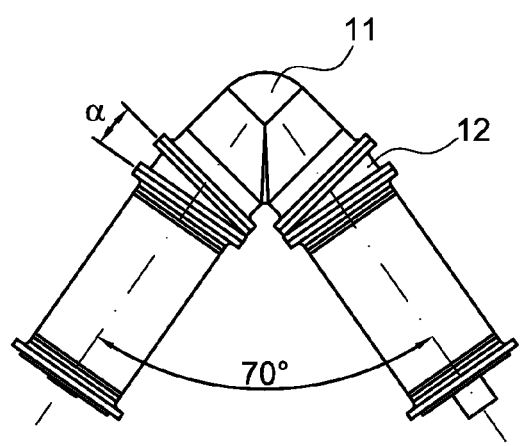
Figure 4B:
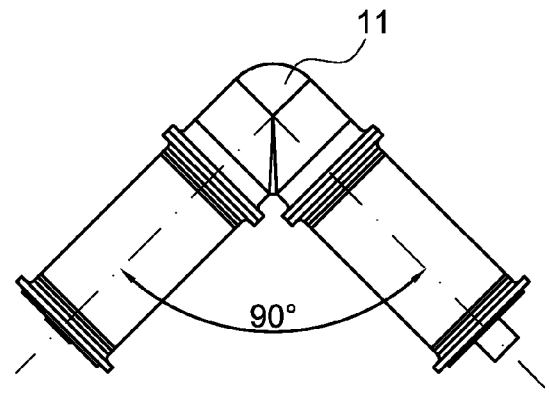
Figure 4C:
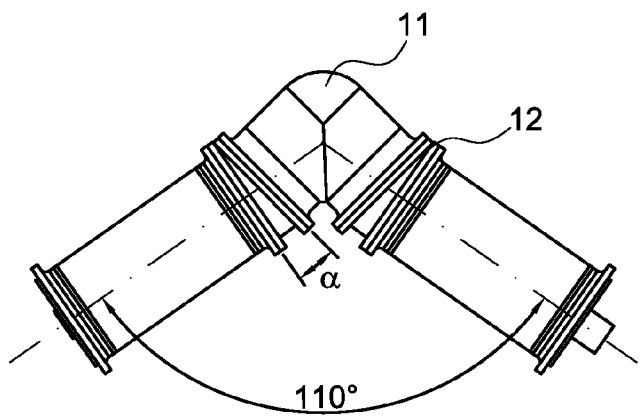

The use of an angled ferrule 11, without the angular rings, as proposed in the embodiment shown in FIG. 4B makes it possible to obtain an overall bend angle of 90°. The embodiment, shown in above-described FIG. 4C, using two angular rings 12 placed in a manner that is identical to the embodiment of FIGS. 2 and 3, therefore makes it possible to obtain a change in direction having an overall angle of 110°.

Figure 4D:
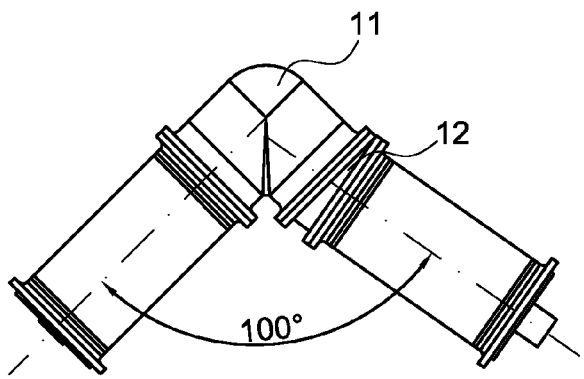

The embodiment of FIG. 4D uses a single angular ring 12. As a result, the overall angle obtained is of 100°.

Figure 4E:
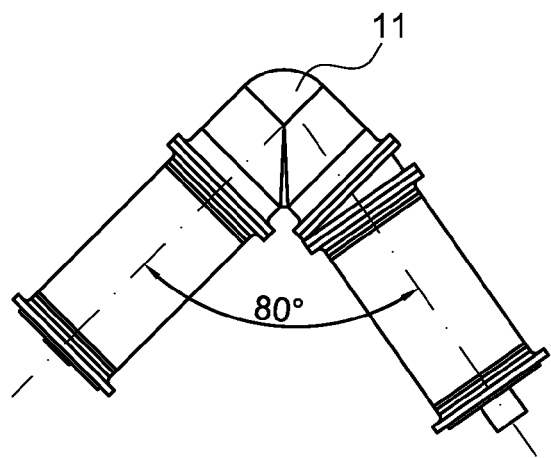

Finally, with reference to said above-mentioned FIG. 4D, when the angular ring 12 is turned by 180° during mounting, its mounting is inverted, as shown in FIG. 4E. In this embodiment, the overall angle obtained is thus of 80°.

Figure 4F:
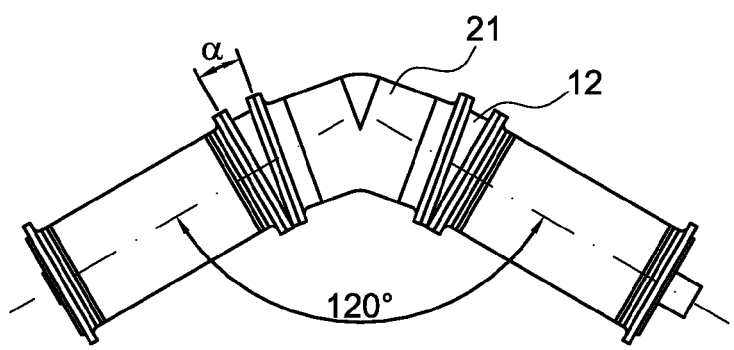

With reference to FIG. 4F, when using an angular ring 21 having a bend angle of 140° and two angular rings 12 mounted in identical manner, with the offset angle α towards the outside, it is possible to obtain an overall direction change angle of 120°.

Figure 4G:
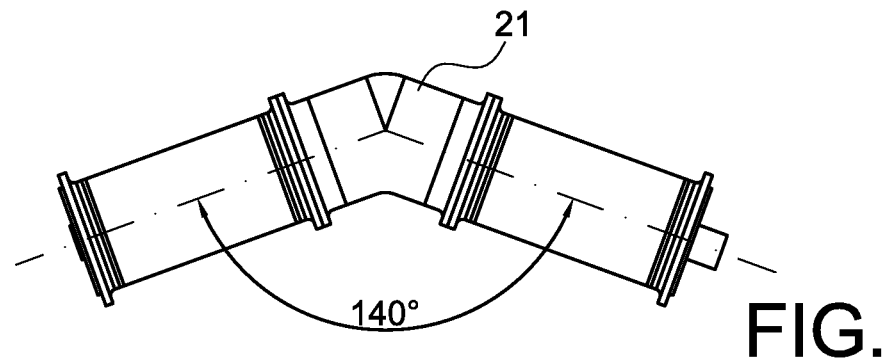

With reference to FIG. 4G, when using only the angled ferrule 21, without an angular ring, the direction change angle is of 140°.

Figure 4H:
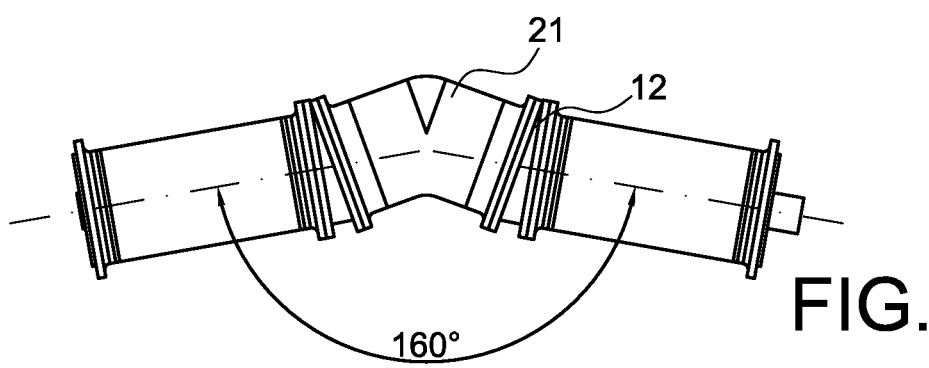

With reference to FIG. 4H, when using the two same angular rings 12, but having an offset angle α that is inverted, an angle of 160° is thus obtained for mounting.

In correspondence with FIGS. 4D and 4E, it can be understood that with a single one of said angular rings 12 and an angled ferrule 21 angled at 140°, it is possible to obtain changes of direction at angles of 130° and 150°.

The angular rings may all be machined with the same angle of 10° with the aim of obtaining a range of angles varying in steps of 10°, as described above. However, it is also conceivable to perform special machining on the angular rings with the aim of obtaining a wider range of direction change angles, e.g. varying in steps of 1°. It is thus possible to manage all possible angular configurations.

Most of the parts used, with the exception of the insulating support 18, are preferably made of aluminum.

The invention claimed is:

1. A direction-changing bend for a high-voltage line of the gas-insulated type, the line comprising:
    two straight sections each composed of:
        a tubular conductive bar (19); and
        a confinement ferrule (13) surrounding the conductive bar (19); and
    an angled ferrule (11, 21);
    the bend being characterized in that it includes two angular rings (12) each designed to be interposed between the ferrule (11, 21) and one of the two conductive bars (19) with its respective confinement ferrule (13) via two connection surfaces, a first connection surface to be fastened on the angled ferrule (11, 21) and a second connection surface to be fastened on a corresponding conductive bar (19), each of the first and second connection surfaces being in a respective plane that is angularly offset from the other plane by a determined angle (α).

2. A bend according to claim 1, characterized in that the angle of the angled ferrule (11) is of 90°, the determined angular offset angle (α) between the angular rings (12) being equal to 10°.

3. A bend according to claim 1, characterized in that the angle of the angled ferrule (11) is of 140°, the determined angular offset angle (α) between the angular rings (12) being equal to 10°.

4. A bend according to claim 1, characterized in that it includes:
    a stationary electrode (14) designed to be connected to a first one of the two conductive bars (19); and
    a movable electrode (15) designed to be connected to the second one of the two conductive bars (19) and mounted on the stationary electrode (14), hinge-like, in such a manner as to be capable of pivoting relative thereto, in particular during mounting.

5. A bend according to claim 4, characterized in that the movable electrode (15) has a joining cavity (15A) that is inclined by the determined angular offset angle (α) at its end (15B) in contact with the corresponding conductive bar (19).

6. A bend according to claim 1, characterized in that it uses two anti-corona caps (16, 17) each placed between a conductive bar (19) and one of the two electrodes (14, 15).

* * * * *